United States Patent
Eline

(10) Patent No.: US 10,165,185 B2
(45) Date of Patent: Dec. 25, 2018

(54) DRONE EQUIPPED WITH A VIDEO CAMERA SENDING SEQUENCES OF IMAGES CORRECTED FOR THE WOBBLE EFFECT

(71) Applicant: PARROT DRONES, Paris (FR)

(72) Inventor: Pierre Eline, Arnouville (FR)

(73) Assignee: Parrot Drones, Paris (FR)

( * ) Notice: Subject to any disclaimer, the term of this patent is extended or adjusted under 35 U.S.C. 154(b) by 190 days.

(21) Appl. No.: 15/333,014

(22) Filed: Oct. 24, 2016

(65) Prior Publication Data

US 2017/0150053 A1 May 25, 2017

(30) Foreign Application Priority Data

Nov. 23, 2015 (FR) .................................... 15 61219

(51) Int. Cl.
*H04N 5/232* (2006.01)
*B64C 39/02* (2006.01)
*B64D 47/08* (2006.01)

(52) U.S. Cl.
CPC ....... *H04N 5/23258* (2013.01); *B64C 39/024* (2013.01); *B64D 47/08* (2013.01); *H04N 5/23267* (2013.01); *B64C 2201/127* (2013.01)

(58) Field of Classification Search
CPC ............ H04N 5/23258; H04N 5/23267; B64C 39/024; B64C 2201/127; B64D 47/08
See application file for complete search history.

(56) References Cited

U.S. PATENT DOCUMENTS

| 2006/0140602 A1 | 6/2006 | Kurata et al. |
| 2013/0044230 A1 | 2/2013 | Zhou |
| 2015/0298822 A1 | 10/2015 | Eline et al. |

OTHER PUBLICATIONS

The French Search Report for the FR 1561219 application is attached.
Chunhua et al., "A Research of the Bandwidth of a Mode-Matching MEMS Vibratory Gyroscope", NANO/MICRO Engineered and Molecular Systems, 2012 7th IEE, pp. 738-741.

*Primary Examiner* — Tat C Chio
(74) *Attorney, Agent, or Firm* — Haverstock & Owens LLP

(57) ABSTRACT

The drone comprises a camera (14) having a rolling shutter digital sensor which sends video data (l) line by line. An inertial unit (26) sends a gyrometric signal representative of the variations in attitude ($\varphi$, $\theta$, $\psi$) of the camera at a given instant. An image processing module (30) comprising an anti-wobble module receives the video data (l) and the gyrometric signal as inputs, and outputs video data processed and corrected for artifacts introduced by the vibrations of the motors of the drone. A complementary filtering module (36) applies a predetermined compensating transfer function to the gyrometric signal at the input of the anti-wobble module, which transfer function is an inverse transfer function of the frequency response of the gyrometric sensor of the inertial unit.

2 Claims, 4 Drawing Sheets

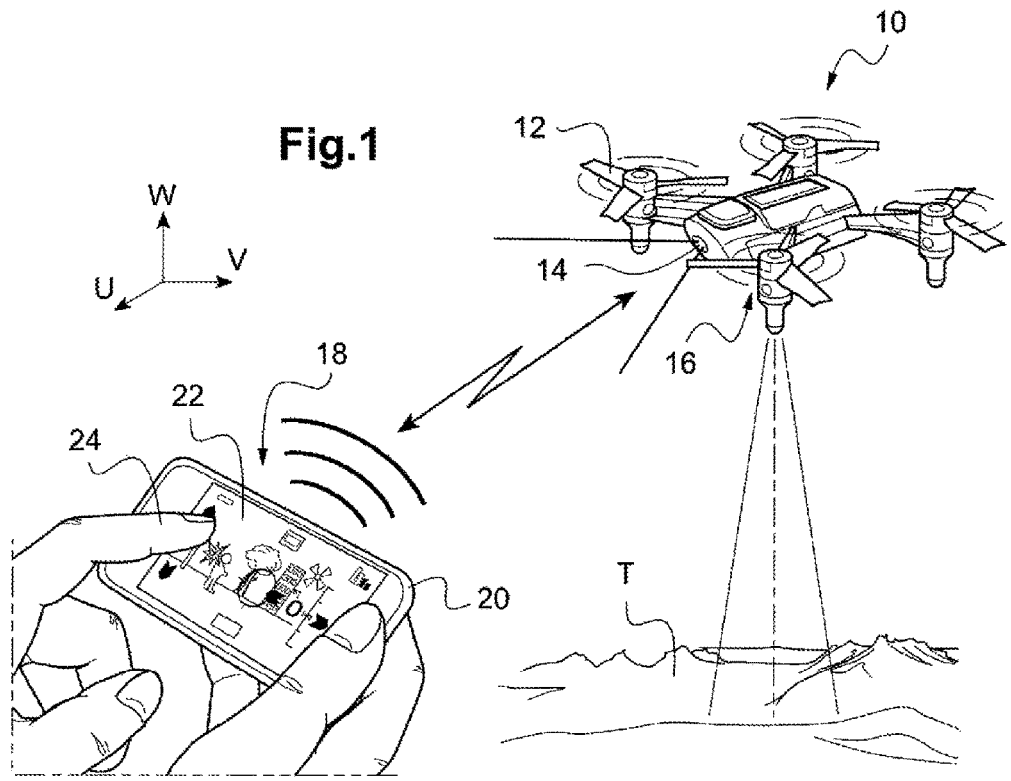
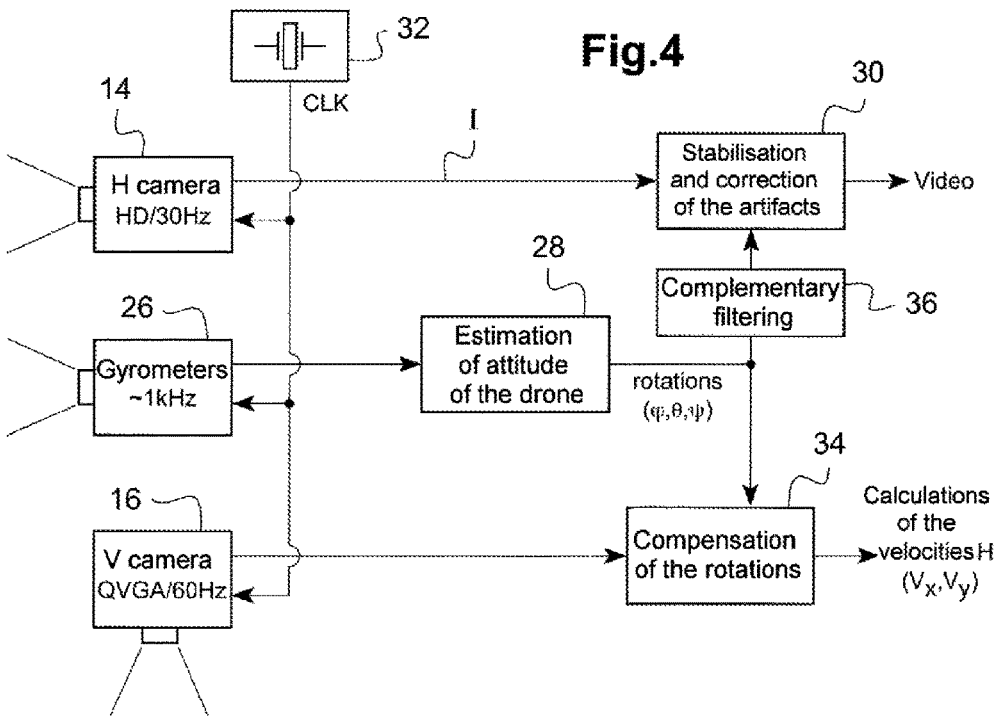

DRONE EQUIPPED WITH A VIDEO CAMERA SENDING SEQUENCES OF IMAGES CORRECTED FOR THE WOBBLE EFFECT

FIELD OF THE INVENTION

The invention relates to the processing of the digital images captured by a camera on board a mobile device, in particular a motorised flying machine such as a drone.

BACKGROUND OF THE INVENTION

The invention is advantageously applicable to the images received by the front camera of a rotary-wing drone such as a quadcopter. A typical example is the AR.Drone 2.0 or the Bebop by Parrot SA, Paris, France, which are quadcopters equipped with a series of sensors (accelerometers, gyrometers, altimeters), a front video camera that captures an image of the landscape towards which the drone is directed, and a vertical-view camera that captures an image of the terrain over which said drone is flying. The drone is provided with multiple rotors that are each driven by a motor that can be controlled individually in order to control the attitude and speed of the drone.

EP 2 364 757 A1, EP 2 613 213 A1, EP 2 613 214 A1 or EP 2 933 775 (corresponding to US2015/0298822 A1), all in the name of Parrot SA, describe various aspects of these drones.

The front video camera can be used for flying a drone in "immersive mode", i.e. when the user uses the image from the camera in the same way as they would if they were on board the drone.

Said front video camera may also be used to capture image sequences of a landscape towards which the drone is directed. The user can thus use the drone in the same way as a camera or a video recorder, which, instead of being held in the hand, would be supported by the drone. The images received can be stored and then distributed, uploaded onto video-hosting websites, sent to other internet users, shared on social networks, etc.

Since these images are intended to be stored and shared, it is desirable for them to have as few defects as possible, in particular defects caused by the dynamics of the drone, which may cause oscillations, distortions and other undesired artifacts in the image captured by the camera.

These defects may be acceptable in an "immersive flying" configuration. However, if the drone is used as a mobile video camera for capturing sequences that will be stored and reproduced later, these defects are extremely disruptive, and therefore it is desirable to minimise them.

SUMMARY OF THE INVENTION

The invention specifically seeks to eliminate the defect known as "wobble", which has the effect of blurring and distorting the image. This effect occurs in the presence of high-frequency and low-amplitude vibrations, typically the vibrations of the motors, which are transmitted to the camera mount and result in distortion of the straight lines, with ripples appearing and waves forming in the image. Even if it is not very pronounced, this effect is very quickly noticeable, and so it rapidly degrades the visual quality of the image.

This particular artifact is due to the rolling shutter (and not global shutter) mechanism used by the sensors of the cameras such as those on board the drones, in which the lines forming the image are not acquired at the same time for all the pixels in the image, but instead are acquired successively. Because of this, the vibrations occurring while an image is being captured generate displacements within the image which are not the same from one line to the next, which is why ripples appear.

The wobble effect can be corrected line by line ("intra-image" correction) by using the measurements from the gyrometers, which send a signal representing the rotations of the drone at a given instant and therefore of the camera in the three axes, including the rapid variations due to the vibrations. The application of an inverse transform of the gyrometric measurement makes it possible to compensate for the wobble effect to a certain extent, because the attitude of the drone can be obtained in a precise manner for each of the lines, and in synchronisation with the sensor of the camera.

digitally implemented image stabilisation technique of this type is described in the aforementioned EP 2 933 775 A1 (US2015/0298822 A1), to which reference can be made for further details.

This being so, as will be explained in greater detail in the detailed description below, this method for compensating for the wobble by using the gyrometric signal is likely to produce overcorrections in some circumstances, thus generating new artifacts and meaning that the corrected image is paradoxically more degraded than the raw image obtained before any correction. In particular, these overcorrections may cause ripples to appear in the image.

These ripples were not present in the raw image and are particularly disruptive if the aim is in particular to capture video sequences in order to store and reproduce them later at the highest quality.

One of the aims of the invention is to overcome this drawback by allowing, as soon as the image is captured, there to be a video signal, transmitted by the drone to the user, which said user can store and reproduce under the best possible conditions, without it being necessary to post-process said signal.

The starting point of the invention is based on the observation that the video stabilisation technique described in particular in the aforementioned EP 2 933 775 A1 (US2015/0298822 A1) does not use image analysis to estimate the movements of the drone requiring compensation. The performance of the stabilisation therefore does not depend on the landscape captured, but only on the precision of the angles of rotation of the drone at a given instant that are estimated by the inertial unit thereof.

In addition, in the high-frequency range (typically the vibration frequencies generated by the motors), a single series of sensors, namely the gyrometers of the inertial unit, estimates the angles of rotation of the drone. The other techniques, for example the analysis of the image sent by the vertical camera, can in fact only provide rotation estimations at a lower frequency than the refresh rate of the images (which is 60 Hz in practice), whereas the vibrations of the motors, corresponding to the rotational frequency of the propellers, are around a fundamental frequency of 120 Hz. The gyrometers of the inertial unit are therefore the only components capable of reliably measuring the vibrations to which the camera is subjected, and so the precision of the measurements sent by these sensors is essential to obtaining effective stabilisation since the correction of the wobble is based entirely on the measurements sent thereby.

However, one of the flaws of this type of component is an irregular transfer function. Ideally, the transfer function of a sensor of this type should have a constant unity gain over the entirety of the operating bandwidth, and a phase varying linearly over the same bandwidth.

Specifically, however, unless very high-precision and therefore expensive components are used, these conditions are not fulfilled. In practice, the profile of the gain characteristic curve often has a bump, corresponding to a resonance, and a gain that gradually decreases towards the high frequencies. It is also noted that the phase is generally far from linear, and this is another source of error in the estimation of the angles, resulting in the stabilisation being impaired.

The article "A research of the Bandwidth of a Mode-Matching MEMS Vibratory Gyroscope", by Chunhua He et al. in *7th IEEE International conference on Nano/Micro Engineered and Molecular Systems (NEMS)*, Mar. 5, 2012, pp. 738-741, proposes improving the transfer function by modifying the gyrometer itself to increase the bandwidth thereof, but without any particular compensating function.

The basic principle of the invention involves, after having identified the transfer function of the component (non-uniformity in gain, non-linearity of the phase, etc.), defining a filter having a complementary transfer function (in gain and phase), and setting, within the drone, corresponding digital filtering which will be applied by the drone to the gyrometric signal samples before applying said samples to the image correction module.

This technique has a double advantage, specifically of:
  eliminating almost all of the overcorrections introduced by the irregular response of the gyrometric sensors, in particular the resonances of the gyrometers; and
  widening the bandwidth of the image stabilisation system upwards by amplifying the high frequencies, in particular the frequencies that are greater than the rotational frequency of the motors and may contain disruptive harmonics, the effects of which on the image need to be reduced, even if these effects are less pronounced than around the frequencies close to the rotational frequencies of the propellers of the drone.

For this purpose, the invention proposes a drone comprising, as is known in particular from the aforementioned EP 2 933 775 A1 (US2015/0298822 A1):
  a camera comprising a lens, a digital sensor on which an image of a landscape is formed, and a rolling shutter mechanism for reading the sensor, which outputs video data line by line;
  an inertial unit, comprising a gyrometric sensor capable of measuring variations in the attitude of the drone and of outputting a gyrometric signal representative of the rotations of the drone at a given instant relative to a given point of reference; and
  an image processing module, comprising an anti-wobble module which receives the video data and the gyrometric signal as inputs, and outputs video data processed and corrected for artifacts introduced by vibrations produced by the drone.

The invention is characterised in that a drone of this type further comprises, at the input of the image processing module:
  a complementary filtering module which is capable of applying a predetermined compensating transfer function to the gyrometric signal at the input of the anti-wobble module, said predetermined transfer function being an inverse transfer function of the frequency response of said gyrometric sensor of the inertial unit.

The invention also relates to a method for correcting a wobble-type artifact introduced by vibrations produced by a drone in a digital image received by a rolling shutter digital sensor of a camera of said drone, in which the drone comprises an inertial unit comprising a gyrometric sensor capable of measuring variations in the attitude of the drone and of outputting a gyrometric signal that is representative of the rotations of the drone at a given instant relative to a given point of reference.

The method of the invention comprises:
  a) in a preliminary step:
    a1) measuring the frequency response of said gyrometric sensor of the inertial unit;
    a2) generating a digital filter having an inverse compensating transfer function of said frequency response (C1) of the gyrometric sensor; and
    a3) loading said digital filter into a complementary filtering module at the input of an anti-wobble module of the drone, and
  b) during operation of the drone, continuously and in real time:
    b1) receiving the gyrometric signal sent by the inertial unit of the drone;
    b2) applying the compensating transfer function loaded into the digital filter in step a3) to the gyrometric signal received in step b1); and
    b3) applying the gyrometric signal filtered in step b2) to the anti-wobble module of the drone.

BRIEF DESCRIPTION OF THE DRAWINGS

An embodiment of the present invention will now be described with reference to the accompanying drawings, in which the same reference signs denote identical or functionally similar elements from one figure to another.

FIG. 1 is a general view showing a drone controlled by a remote control device.

FIG. 4 shows, in the form of a block diagram, the different elements contributing to the mechanism for stabilising and correcting the image according to the invention.

DETAILED DESCRIPTION OF THE INVENTION

Figure 2:
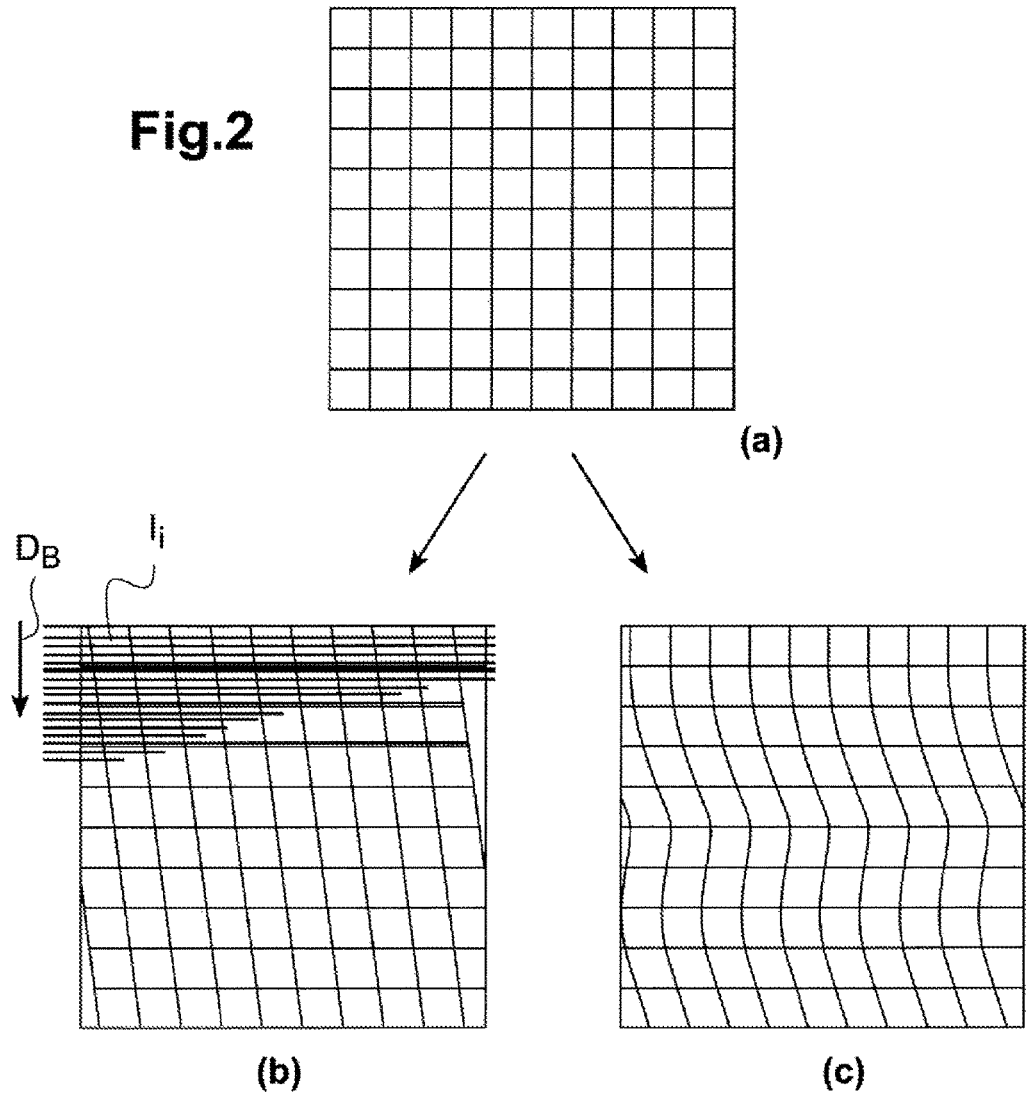
FIG. 2 shows the jelly and wobble artifacts which can be seen on the image of a checkerboard pattern before any corrective filtering has been applied.

An embodiment of the apparatus of the invention will now be described.

In FIG. 1, the reference sign 10 generally denotes a drone, for example a quadcopter such as the Bebop Drone model by Parrot SA, Paris, France. This drone comprises four coplanar rotors 12, the motors of which are controlled separately by an integrated navigation and attitude-control system. It is provided with a front-view camera 14 for capturing an image of the landscape towards which the drone is directed, for example a wide-angle, high-definition camera having a 1920×1080 pixel CMOS sensor with a video stream refresh rate of 30 fps (frames per second). The drone is also provided with a vertical-view camera 16 pointing downwards, for example a QVGA-resolution (320×240 pixels) camera having a CMOS sensor with a video stream refresh rate of 60 fps and a field angle of 64°. This camera 16 captures successive images of the terrain T over which the drone is flying, and these are used in particular to analyse the speed of the drone relative to the ground.

The drone is also equipped with inertial sensors (accelerometers and gyrometers) for measuring, to a certain degree of precision, the angular speeds and the attitude angles of the drone, i.e. the Euler angles (pitch v, roll Band yaw describing the inclination of the drone relative to a horizontal plane of a fixed point of reference UVW on the ground, with the understanding that the two longitudinal and transverse components of the horizontal velocity are closely linked to the inclination along the two axes of pitch and roll, respectively.

The drone 10 is controlled by a remote control device 18 such as a mobile telephone or tablet having a touch screen and integrated accelerometers, for example an iPhone (registered trademark) or similar, or an iPad (registered trademark) or similar. This device is a standard device that has not been modified except for a custom software application having been downloaded, such as the mobile application AR Free Flight (registered trademark), in order to control the flight of the drone 10 and the display of the images taken by the on-board front camera 14. The device 18 comprises a body 20 and a touch screen 22 that displays the image of the landscape captured by the front camera 14, a number of symbols overlaid to allow flying controls (ascent/descent, etc.) to be activated by a user simply touching the symbols displayed on the screen with their finger 24. The device 18 is also provided with inclination sensors for controlling the attitude of the drone by inclining the device accordingly about the roll and pitch axes in order to make the drone move forwards or backwards. The user's actions are interpreted by the custom software application, which transforms them into control signals for the drone.

As set out at the start, the high-definition image provided by the front camera 14 is particularly subject to image blurring and distortion, known as jelly and wobble, which produce effects which, even if they are not very pronounced, are very noticeable and rapidly degrade the visual quality of the image.

In FIG. 2, image (b) shows the jelly distortions and image (c) shows the wobble distortions, which can both be seen in the image of a checkerboard pattern as shown in (a). These artifacts are specific to a rolling shutter sensor (and not a global shutter sensor), in which the lines forming the image are not acquired at the same time for all the pixels in the image, but instead are acquired successively line by line (or group of lines by group of lines) as the sensor scans in the direction $D_B$, perpendicularly to the lines $l_i$. The movements of the drone and the vibrations occurring while an image is being captured generate displacements within this image that will not be the same from one line to the next.

The jelly effect, which can be seen in image (b), appears when there are high-amplitude but relatively low-frequency camera movements, for example in the event of significant rotations of the drone: as the drone turns, the image will be displaced by several pixels between the start and the end of the sensor scanning period by means of the rolling shutter (in the example in the figure, by approximately one square of the checkerboard between the top and the bottom of the image). This effect can be mitigated by assigning each line I, of the image an appropriate offset as the sensor scans $D_B$, this line-by-line correction allowing the jelly artifact introduced by the rapid rotation of the drone to be cancelled out.

The other type of artifact, referred to as the wobble effect, as shown in image (c), is the effect to which the present invention relates.

By contrast with the jelly effect, which is a low-frequency and high-amplitude effect caused by the rotations of the drone in order for it to move, the wobble effect is mainly caused by the vibrations of the motor, which introduce high-frequency (typically of about 120 Hz) and low-amplitude oscillations. These vibrations are transmitted to the camera mount, and cause distortion of the straight lines, with ripples appearing and waves forming in the image.

The wobble effect is partially corrected by suitable mechanical damping of the camera mount, allowing the vibrations of the motor to be filtered out, as described for example in WO 2011/058255 A1 (Parrot SA).

In practice, this mechanical filtering is not sufficient, and the remainder of the wobble effect needs to be eliminated, which can be done by using measurements sent by the inertial unit of the drone that are representative of the rotations of the drone at a given instant caused by the vibrations, and by applying appropriate corrections on the basis of these measurements.

The gyrometers of the inertial unit in fact make it possible to give a precise indication of the attitude of the drone at a given instant for each of the lines, allowing line-by-line "intra-image" correction, with adjustment of the successive lines relative to one another in order to send an image that is as close as possible to the captured landscape, i.e. the checkerboard pattern (a) in the present example.

The aforementioned EP 2 933 775 A1 describes a wobble correction technique of this type, which uses the signals sent by the gyrometers of the inertial unit of the drone.

In practice, however, this anti-wobble correction by applying an inverse gyrometric signal has some limitations.

Indeed, it is noted that anti-wobble generally has a tendency to overcorrect the vibrations in the image within frequency ranges close to those of the nominal rotational frequency of the propellers (i.e. the fundamental frequency of the vibrations to be corrected), and to undercorrect the higher frequencies beyond this frequency.

The inventors' analysis of the response of the gyrometric sensor revealed the source of this anomaly, which essentially lies in the flawed characteristic curve of the transfer function (frequency response) of this sensor.

Figure 3A:
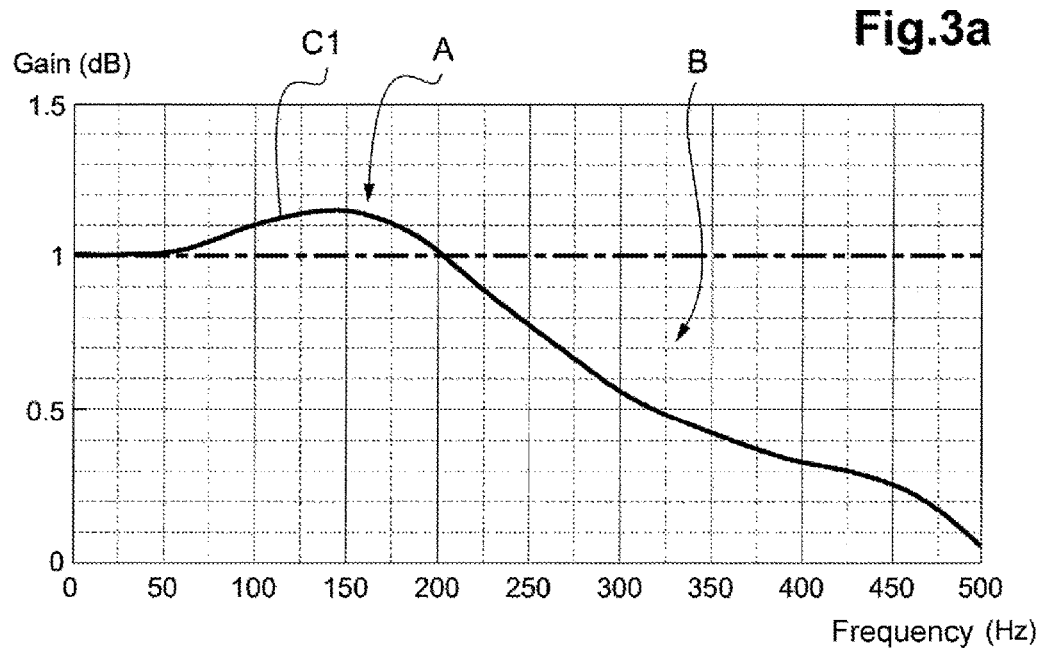
FIGS. 3*a* and 3*b* are typical Bode plots (a Bode gain plot and a Bode phase plot, respectively) for the transfer function of a gyrometric sensor incorporated into the inertial unit of a drone.
Figure 3B:
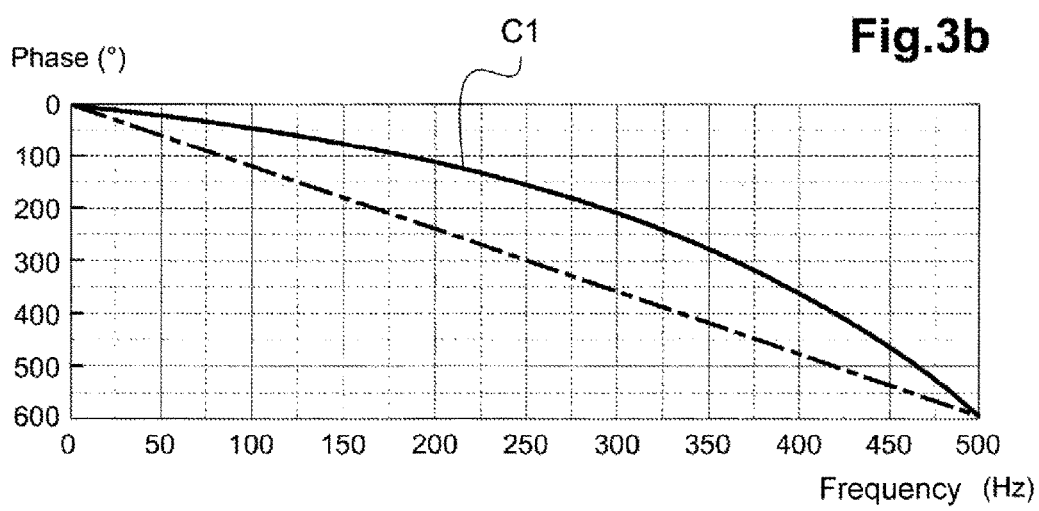

Reference is made to FIGS. 3a and 3b, which show typical Bode plots (a Bode gain plot and a Bode phase plot, respectively) for the response of a gyrometric sensor used in the inertial unit of a consumer drone, which uses more cost-effective components.

An ideal transfer function would have a unity gain and a linear phase over the entirety of the bandwidth in question.

However, as can be seen in FIGS. 3a and 3b, this is not the case.

In the example shown, on the gain characteristic curve (FIG. 3a), it is noted at A that there is significant resonance (gain of approximately 1.15) at a frequency of approximately 140 Hz, very close to the nominal rotational frequency of the propellers of the drone, which is the source of wobble in the image. It is also noted that the phase characteristic curve (FIG. 3b) is far from linear, and this also introduces a source of error into the estimation of the angles, resulting in the stabilisation of the image being impaired. In addition, for the frequencies above approximately 200 Hz, a gradual drop in gain is noted at B.

These defects result in an overcorrection of the wobble for the frequencies around 140 Hz (frequencies that are the most critical since they correspond to the fundamental frequency of the vibrations to be filtered out), and in an undercorrection beyond 200 Hz: in the first case, the correction introduces ripples into the image which were not there initially, whereas in the second case said correction does not sufficiently filter out the ripples in said image.

The aim of the invention is to propose a technique that makes it possible to overcome this drawback.

FIG. 4 shows, in the form of a functional block diagram, the various modules involved in implementing this invention, in order to completely correct the wobble effect on the image signal l sent by a camera 14 comprising a rolling shutter sensor, such as the high-definition, front-view camera of the drone 10 in FIG. 1.

It is noted that, although these diagrams are in the form of circuits or interconnected modules, the various functions are essentially implemented using software, and this representation is only given by way of example.

The camera 14, which is mechanically connected to the body of the drone, is subjected to high-amplitude and low-frequency angular movements (movements of the drone) as well as low-amplitude and high-frequency angular movements (vibrations of the motors). These movements to which the camera is subjected are measured by an inertial unit 26 that is connected to the body of the drone and therefore to the camera, and equipped in particular with gyrometric sensors. The measurements from these sensors are applied to a module 28 for estimating the attitude of the drone, which sends indications of the pitch angle φ, roll angle θ and yaw angle ψ, which describe the inclination of the drone at a given instant in the three dimensions relative to a fixed point of reference on the ground (Euler angles). These rotational-angle data are applied to a module 30 for digitally correcting the image data I, which module performs various functions such as windowing, image stabilisation, extraction and straightening of a useful area, correction of the geometric distortions introduced by the lens of the camera, etc. The module 30 outputs a useful video signal, which is transmitted to the remote user in order to be displayed on the screen of their remote control device and to possibly be stored for later distribution.

The module 30 also corrects the jelly and wobble artifacts, and in particular compensates for the wobble effect (described above with reference to FIG. 2) by using a technique such as that described in the aforementioned EP 2 933 775 A1. Essentially, it involves applying an inverse transform of the gyrometric measurement to the image signal so as to adjust the successive lines relative to one another depending on the variations in the attitude of the drone at a given instant from one line to another.

The camera 14 and the inertial unit 26 are controlled by a common clock module 32, the respective operating frequencies of the inertial unit and the camera being submultiples of the frequency CLK of this clock 32. The clock 32 also controls the vertical camera 16, the output signal of which is applied to a module 34 for compensating for the rotations from one image to the next on the basis of the estimations of the rotations calculated by the module 28, before calculating the horizontal velocities $V_x$ and $V_y$ by means of various suitable algorithms that operate by comparing the apparent movement between two consecutive images, which are adjusted in rotation, of the terrain over which the drone is flying.

In a characteristic manner, the invention provides for a complementary filter 36 to be inserted between the module 28 for estimating the angles of the drone and the module for digitally correcting the image 30, the transfer function of which filter will compensate for the flawed transfer function of the gyrometric sensors of the inertial unit 26.

The filtering is predetermined filtering, the transfer function of which has been determined after having identified in advance (for example when leaving the factory) the actual transfer function of the gyrometric component used by the drone.

Figure 5A:
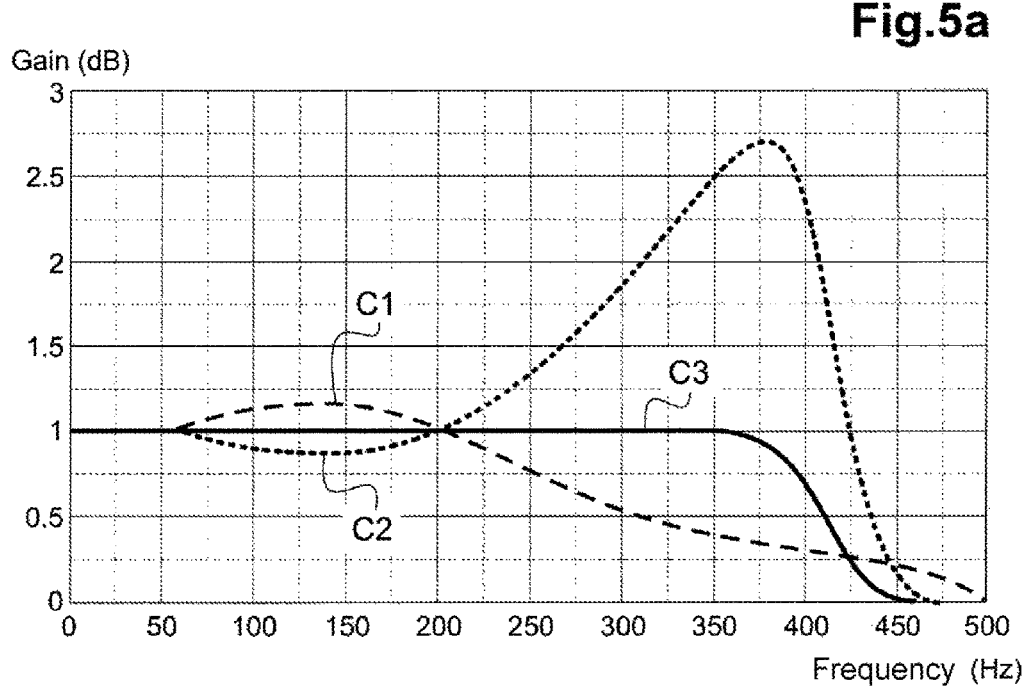
FIGS. 5*a* and 5*b* show the Bode plot corresponding to the transfer function of the compensating filtering applied according to the teaching of the invention overlaid with the transfer function of the gyrometric sensor from FIGS. 3*a* and 3*b*, and also show the transfer function resulting from the compensation thereof by the filtering transfer function.
Figure 5B:
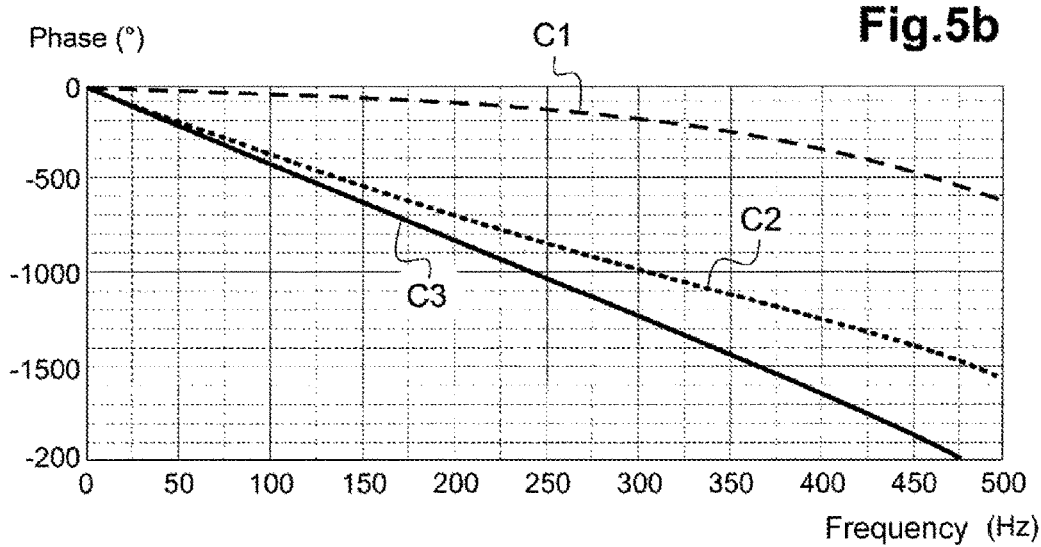

FIGS. 5*a* and 5*b* show the Bode plots (Bode gain plot and Bode phase plot as a function of frequency) corresponding to the transfer function C2 of the compensating filtering applied according to the teaching of the invention. In C1, the effective transfer function of the component is overlaid, the function being that shown and described with reference to FIGS. 3*a* and 3*b*.

A complementary filter, corresponding to the transfer function C2, is generated from the function C1, and is set in the filtering module 36 so as to apply this complementary filtering to the successive samples of the values at a given instant representing the rotations of the drone in the three axes.

The characteristic curve C3 in FIGS. 5*a* and 5*b* shows the total response resulting from the combination of the response C1 of the gyrometric component and of the compensating filtering C2. It can be noted in particular that applying the compensating filtering makes it possible to:
  suppress the bump in resonance around the critical frequency of 140 Hz, close to the nominal rotational frequency of the propellers generating the vibrations to be filtered out;
  increase the bandwidth towards the high frequencies up to approximately 350 Hz, which in particular makes it possible to filter out the first harmonic of the frequency of the vibrations; and
  linearise the phase response, with a corresponding improvement in the stabilisation of the image.

The invention claimed is:

1. A drone, comprising:
  a camera comprising a lens, a digital sensor on which an image of a landscape is formed, and a rolling shutter mechanism for reading the digital sensor, which outputs video data line by line;
  an inertial unit, comprising a gyrometric sensor capable of measuring variations in attitude of the drone and of outputting a gyrometric signal representative of rotations of the drone at a given instant relative to a given point of reference; and
  an image processing module, comprising an anti-wobble module which receives the video data and the gyrometric signal as inputs, and outputs video data processed and corrected for artifacts introduced by vibrations produced by the drone,
wherein the drone further comprises, at the input of the image processing module:
  a complementary filtering module which is capable of applying a predetermined compensating transfer function to the gyrometric signal at the input of the anti-wobble module, said predetermined compensating transfer function being an inverse transfer function of frequency response of said gyrometric sensor of the inertial unit.

2. A method for correcting a wobble artifact introduced by vibrations produced by a drone in a digital image received by a rolling shutter digital sensor of a camera of said drone, in which the drone comprises an inertial unit comprising a gyrometric sensor capable of measuring variations in attitude of the drone and of outputting a gyrometric signal that is representative of rotations of the drone at a given instant relative to a given point of reference, the method comprising:
- a) in a preliminary step:
  - a1) measuring frequency response of said gyrometric sensor of the inertial unit;
  - a2) generating a digital filter having an inverse compensating transfer function of said frequency response of the gyrometric sensor; and
  - a3) loading said digital filter into a complementary filtering module at the input of an anti-wobble module of the drone, and
- b) during operation of the drone, continuously and in real time:
  - b1) receiving the gyrometric signal sent by the inertial unit of the drone;
  - b2) applying the compensating transfer function loaded into the digital filter in step a3) to the gyrometric signal received in step b1); and
  - b3) applying the gyrometric signal filtered in step b2) to the anti-wobble module of the drone.

* * * * *